Feb. 1, 1949.  M. L. WHITSON ET AL  2,460,325
EXPANSIBLE MANDREL
Filed June 23, 1945  2 Sheets-Sheet 1

Inventors
MERCER L. WHITSON
HARRY H. HARCUM
By Ralph L Chappell
Attorney

Feb. 1, 1949.　　M. L. WHITSON ET AL　　2,460,325
EXPANSIBLE MANDREL
Filed June 23, 1945　　2 Sheets-Sheet 2

Inventors
MERCER L. WHITSON
HARRY H. HARCUM

By Ralph L Chappell
Attorney

Patented Feb. 1, 1949

2,460,325

UNITED STATES PATENT OFFICE 2,460,325

EXPANSIBLE MANDREL

Mercer L. Whitson, Norfolk, and Harry H. Harcum, Portsmouth, Va.

Application June 23, 1945, Serial No. 601,275

5 Claims. (Cl. 29—284)

(Granted under the act of March 3, 1883, as amended April 30, 1928; 370 O. G. 757)

This invention relates to an expansible work support especially adapted to be utilized for supporting work which is to be fabricated and shaped thereon and in particular relates to an expansible support for use in fabricating pipe covers.

One object of this invention is to provide a substantially cylindrical work support which is composed of a plurality of staves adapted to be adjusted to any one of a number of diameters depending upon the size of the pipe cover to be fabricated thereon.

Another object of this invention is to provide a work support which is adapted to be readily adjusted to the size desired.

A further object of this invention is to provide a support which may be readily collapsed for permitting the removal of work pieces therefrom which have been fabricated thereon.

Other objects as well as the various other novel features and advantages of this invention will become apparent from an examination of the description and accompanying drawings, of which:

Figure 1:
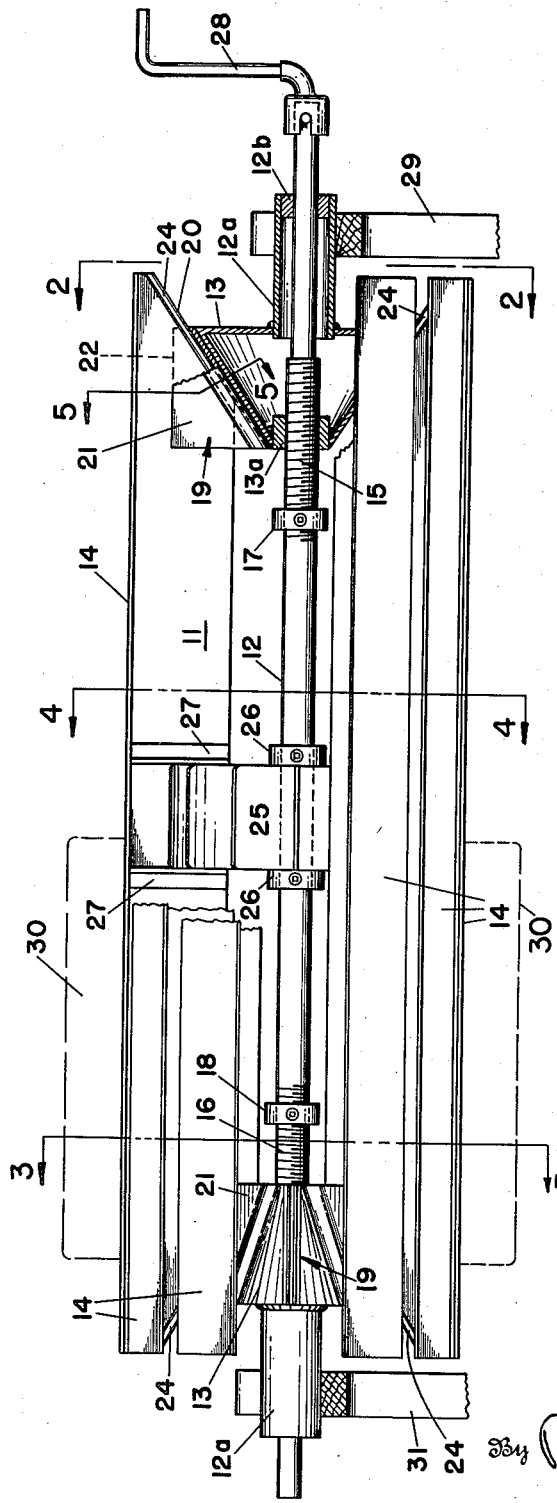
Fig. 1 is a cut-away side elevational view of the mandrel in a partially expanded condition.
Figure 4:
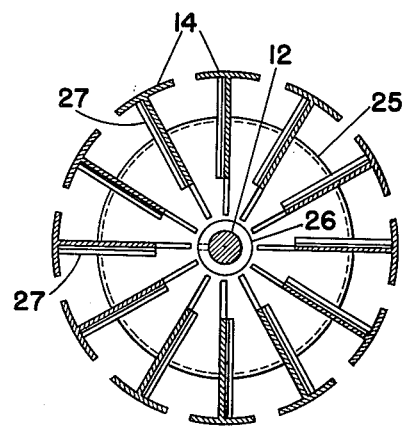
Fig. 4 is a sectional view taken at 4—4 of Fig. 1.
Figure 2:
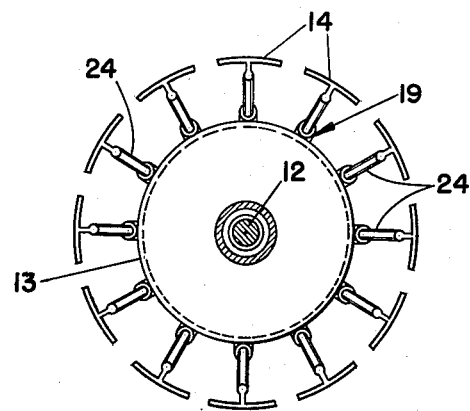
Fig. 2 is an end elevational view taken at 2—2 of Fig. 1.
Figure 3:
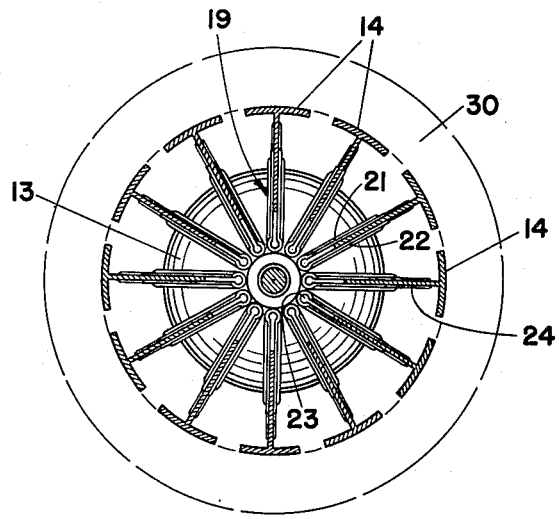
Fig. 3 is a sectional view taken at 3—3 of Fig. 1.
Figure 5:
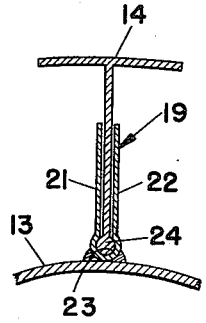
Fig. 5 is a sectional view taken at 5—5 of Fig. 1.

With reference to the figures, in particular Figs. 1 and 2, the expansible mandrel 11 comprises a shaft 12, having mounted thereon for axial movement relative thereto two cones 13 adapted to cooperate with a plurality of staves 14, spaced parallel to each other at intervals around the periphery of the cones 13, which staves are moved radially by longitudinal movement of cones 13 for thereby increasing or decreasing the effective diameter of the work-supporting mandrel.

As will be apparent, the cones 13 are provided with threaded elements 13a through which shaft 12 passes so that the right and left hand threads 15 and 16 thereof are threadably engaged by said elements. In order that the cones 13 may be positioned at a desired point, adjustable stops in the form of collars 17 and 18 are threadably engaged with shaft 12 so that they may be positioned as desired merely by rotating them relative to the shaft 12. On the surface of cones 13 are welded a plurality of metal guide channels 19, each consisting of parallel side wall members 21 and 22 defining an enlarged opening or channel 23 at the point of juncture at their bases.

Each of the staves 14 is T-shaped in cross-section, the ends of the base portion of which are tapered at 20 to conform with the slope of the cones 13 and provided with runners 24 adapted to slide within the openings 23 for guiding the staves 14 as they are moved radially outward. As noted in Fig. 1, the ends of the cones 13 are welded to short tubes 12a within which are secured bushings 12b through which the ends of shaft 12 pass so that when the cones 13 are positioned longitudinally along the shaft, the bushings will provide an adequate sliding support therefor.

In addition, there is secured to shaft 12 a spool or drum 25, slotted longitudinally, adapted to receive for sliding movement therein the base portion of the T-shaped staves. Collars 26 are adapted to slide along shaft 12 for locating and locking spool 25 in the longitudinal positions desired. The ends of the spool or cylinder 25 are slidably engaged by angles 27 welded to the base portion of the T-shaped staves so as to prevent longitudinal motion of the staves either when they are moved radially to the expanded position or when material is being applied thereto for fabricating objects thereon. For expanding or contracting the mandrel 11, it is merely necessary to rotate shaft 12 by means of a crank 28, holding one of the staves to prevent rotation of the mandrel, so that the cones are caused to travel toward or away from each other as desired.

In order to afford a better understanding of the invention, the intended mode of operation is as follows:

The expansible mandrel 11 is positioned on two supports 29 and 31, the crank 28 secured to one end of the shaft 12, one of the staves 14 grasped by the hand of the operator to prevent rotation thereof, and the crank 28 rotated in order to cause the cones 13 to move inwardly toward each other for expanding the mandrel to the diameter desired. The crank 28 is then removed from the shaft and the mandrel is now ready for receiving the material which is to be fabricated thereon in the form of a hollow cylindrical pipe cover or the like. The material 30 is applied to the mandrel, as the mandrel is slowly rotated by hand, the mandrel of course being stopped at any point desired to make any adjustments of the material thereon, to trim the edges thereof or cause any other operations to be performed thereon which may be necessary.

As soon as the fabrication of the pipe cover has been completed and it is desired to remove it from the expansible mandrel, it is merely necessary to rotate the shaft 12 in the opposite direction to that employed for expanding the mandrel so that the cones 13 are caused to travel away from each other thereby causing staves 14 to move radially inward to decrease the diameter of the mandrel. The finished pipe cover is readily removed from the mandrel simply by sliding it over one end thereof.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention herein described and claimed may be manufactured and used by or for the Government of the United States of America for governmental purposes without the payment of any royalties thereon or therefor.

We claim:

1. A work support comprising a plurality of radially movable members substantially defining an elongated cylinder, a shaft, means comprising a plurality of truncated cones interposed between said members and said shaft adapted to move axially along said shaft when said shaft is rotated relative to said members to insure radial movement of said members toward or away from said shaft, and guide means associated with said shaft comprising a spool associated with and adapted to be adjusted axially of said shaft for restricting movement of said members in a radial direction with respect to said shaft.

2. A work support comprising a plurality of radially movable members the outer surfaces of which define substantially an elongated cylinder, a common shaft upon which said members are mounted, means comprising two oppositely disposed internally threaded truncated cones through which said shaft passes, right and left hand threads respectively on said shaft adapted to cooperate with the threads of said cones for insuring opposed movement of said cones when said shaft is rotated relative thereto to insure radial movement of said members, and guide means associated with said shaft comprising a spool associated with and adapted to be adjusted axially of said shaft for restricting movement of said members in a radial direction with respect to said shaft.

3. A work support comprising a plurality of radially movable members the outer surfaces of which define substantially an elongated cylinder, a common shaft upon which said members are mounted, means comprising two oppositely disposed internally threaded truncated cones through which said shaft passes, right and left hand threads respectively on said shaft adapted to cooperate with the threads of said cones for insuring opposed movement of said cones when said shaft is rotated relative thereto to insure movement of said members, slotted guide means within which a portion of each of said members is received, and a second guide means comprising a spool associated with and adapted to be adjusted axially of said shaft for restricting movement of said members in a radial direction with respect to said shaft.

4. A work support comprising a plurality of radially movable members, the outer surfaces of which define substantially an elongated cylinder, a common shaft upon which said members are mounted, means comprising two oppositely disposed internally threaded truncated cones through which said shaft passes, right and left hand threads respectively on said shaft adapted to cooperate with the threads of said cones for insuring opposed movement of said cones when said shaft is rotated relative thereto, a plurality of runners secured to said members, a plurality of slotted guides secured to said cones adapted to receive said runners for slidable movement therein, a spool interposed between said cones and slidably mounted on said shaft, a pair of adjustable collars secured to said shaft, one on either side of said spool for locking said spool in place and for preventing movement axially of said members relative to said shaft, and guide means associated with said spool and said members for permitting radial movement of said members relative to said shaft.

5. A work support comprising a plurality of radially movable T-shaped staves having arcuate cross arms, which define substantially an elongated cylinder when considered as a whole, and masts which terminate in runners at the base thereof, a common shaft upon which said staves are mounted, means comprising two oppositely disposed internally threaded truncated cones through which said shaft passes, right and left hand threads respectively on said shaft adapted to cooperate with the threads of said cones for insuring opposed movement of said cones when said shaft is rotated relative thereto, a plurality of slotted guides secured to said cones adapted to receive the runner portion of said masts for slidable movement therein, a spool interposed between said cones and slidably mounted on said shaft, a pair of adjustable collars secured to said shaft, one on either side of said spool, for locking said spool in place and for preventing axial movement of said staves relative to said shaft, and guide means associated with said spool and said members for permitting radial movement of said members relative to said shaft.

MERCER L. WHITSON.
HARRY H. HARCUM.

REFERENCES CITED

The following references are of record in the file of this patent:

UNITED STATES PATENTS

| Number | Name | Date |
|---|---|---|
| 342,218 | Miller | May 18, 1886 |
| 640,524 | Bartels | Jan. 2, 1900 |
| 1,528,353 | Waterman | Mar. 3, 1925 |
| 1,878,725 | Stovall | Sept. 20, 1932 |
| 2,167,338 | Murcell | July 25, 1939 |
| 2,367,831 | Manson | Jan. 23, 1945 |